Patented June 9, 1942

2,285,708

UNITED STATES PATENT OFFICE 2,285,708

CULTURE MEDIUM FOR THE GROWTH OF MICRO-ORGANISMS

John H. Glynn, Chicago, Ill., assignor to Armour and Company, Chicago, Ill., a corporation of Illinois No Drawing. Application July 5, 1939, Serial No. 282,943

4 Claims. (Cl. 195—100)

This invention is concerned with an improved culture medium for accelerating the growth of microorganisms.

The growth and reproduction of microorganisms, such as yeast, bacteria, actinomycetes, molds and spirochetes, are dependent upon readily available food and energy contained in their immediate environment. Such microorganisms do not possess special digestive apparatus within their own bodies and, therefore, their processes of metabolism in their natural habitat are accomplished by the secretion of enzymes into their environment, the external digestion, or conversion of food into soluble form, and the absorption of such soluble materials thru the cell wall into the organism. The recognition of this physiological process in nature has led many investigators to develop artificial culture media, or environments, containing predigested and soluble materials in which the rate of growth and reproduction of many species of microorganisms are greatly accelerated.

Wide differences in food and energy requirements are found to exist between the various kinds of microorganisms. For example, certain groups such as the autotrophic bacteria (those which do not require preformed nutrients) are able to utilize relatively simple inorganic sources of carbon and nitrogen, such as carbon dioxide, ammonia, nitrites, etc. On the other hand, certain other groups, which include most of the species parasitic on the human race, are unable to make use of these simple compounds and, indeed, are not found in nature except as parasites on the human race where complex compounds of carbon and nitrogen are available.

It has been found in the past that, in order to cultivate many of these species of human parasites in artificial media containing predigested and soluble nutrients, it has been necessary to add also fresh body fluids such as blood serum, ascitic fluid, exudates and so forth. Difficulty has been encountered in making such additions because strictly aseptic technique is obligatory. Furthermore, these fluids cannot be subsequently heat sterilized without great losses in their growth promoting properties.

I have now discovered that the growth of most species of microorganisms can be advanced by preparing a predigested and soluble artificial culture medium in which is incorporated a small amount of boric acid or of a salt of boric acid. I have further discovered that certain proteinaceous materials when digested with both trypsin and pepsin give an improved nutrient medium for bacteria, yeasts, etc. In preparing an improved medium a mixture of proteinaceous materials such as casein, egg albumin and blood fibrin are digested by peptic and tryptic enzymes and the resulting mixture may be filtered. To the filtrate may be added certain organic substances as will be hereafter described, including heat stable aqueous extracts of liver and spleen.

An advantage of this culture medium is that it can be sterilized with heat, substantially without loss of growth-promoting properties, so that aseptic technique is not critical.

Another advantage is that the growth and reproduction of a great variety of microorganisms are greatly advanced by this medium. My improved culture medium contains a wide selection of nutrient break-down products and therefore can be utilized by a great number of species of bacteria, actinomycetes, etc.

A great advantage is gained by utilizing the unexpected function of boric acid or salts thereof in enhancing the growth and reproduction of the many varieties of microorganisms. Boric acid has in the past been generally employed as a germicide.

The boric acid or boric acid salt may be added to the medium at any stage and need be added only in small proportions. Boron, calculated as boric acid, should be present in amounts not to exceed 0.015% and best results have been obtained when the addition amounted to less than 0.0002% by weight of final product. The boric acid or borate may be added during the peptic or tryptic digestion, to the filtrate from this digestion or to the final mixture.

The predigested and soluble culture medium may be prepared by mixing blood fibrin and casein and digesting the mixture with pepsin in an aqueous medium and then digesting the resultant mixture with trypsin. The final digestate is filtered and to the filtrate may be added other organic compounds, such as nicotinic acid, thiamine, etc., along with a small amount of boric acid. The said medium may also be prepared by mixing blood fibrin and egg albumen and digesting with pepsin and then digesting the resultant mixture with trypsin. The final digestate is filtered and to the filtrate may be added the substances given above. The said medium may also be prepared by mixing egg albumen and casein and digesting with pepsin and then with trypsin. The final digestate is then filtered and to it may be added the substances shown above. However, I prefer to admix casein, blood fibrin and egg albumen as illustrated by the example hereinafter given.

As an example of the method of preparing my culture medium 2000 parts by weight of fresh, moist blood fibrin are mixed with 500 parts by weight of dry casein, 500 parts by weight of dry egg albumen and 1000 parts by weight of water. To this solution is added 0.005 part by weight of boric acid and the mixture is adjusted to pH 2.5 with hydrochloric acid. The whole is then heated to 40° C. and there are added 25 parts by weight of 1-10,000 pepsin. The mixture is allowed to digest for fifteen minutes at 37° to 40° C. At the end of this time, it is adjusted to pH 7.5 with ammonium hydroxide. There are then added to the mixture 40 parts by weight of U. S. P. trypsin and the whole is allowed to stand at 37° C. for three hours. At the end of this digestion the mixture is heated to 100° C., held at this temperature for one minute and then filtered. The filtrate may be dried or may have other constituents added.

In place of using 40 parts of U. S. P. trypsin as given above I can use 250 parts of fresh pancreas and 25 parts of fresh duodenum, both suitably finely ground. In place of boric acid about 0.002 part by weight of sodium tetraborate could be added.

In the process as shown the trypsin digestion may be made first and then the pepsin digestion but in this order the reaction takes longer and I prefer to digest first with pepsin and then with trypsin.

This constitutes an improved basic culture medium for furthering the growth of microorganisms. It consists of the improved mixture of nutrients provided by the digestion as described and is characterized by the presence of small amounts of boric acid. I have discovered that boron, calculated as boric acid, must be present in amounts of not less than about 0.00001% and not more than about 0.015%. Less than the lower limit has no appreciable effect and more than the upper limit has an inhibitory effect upon the microorganisms. Within the limits shown, however, growth is stimulated.

To this basic medium may be added other components which provide still other nutrients for the microorganisms. For example, I can prepare a mixture containing:

| | Grams |
|---|---|
| Nicotinic acid | 0.5 |
| Thiamine | 0.5 |
| Riboflavin | 0.5 |
| Beta-alanine | 0.5 |
| Iso-inositol | 0.5 |
| Hemin | 0.5 |
| Sodium citrate | 0.01 |
| Naphthyl acetic acid | 0.01 |
| Indole-butyric acid | 0.01 |
| Indole-3-acetic acid | 0.01 |
| Gelatin | 30.00 |
| Heat-stable aqueous extract of liver and spleen | 10.00 |

This mixture is filtered to give a clear liquid and is added to the filtrate obtained as shown above. The mixed filtrates are then conveniently concentrated to a syrupy consistency in a still and evaporated to dryness in vacuo at 56° C. This product is suitable for growing very wide varieties of microorganisms and may be employed as a one percent solution in water, which is then adjusted to the proper pH for the particular species of organisms intended to be grown and sterilized at 120° C. in an autoclave for 20 minutes.

Particular combinations of the above-named ingredients of the addition mixture may be added to the basic culture medium and will favorably affect the growth of particular organisms. The above examples are given by way of illustration and it is to be understood that variations in amounts of ingredients, time and temperatures of the digestion, and in the constitution of the addition mixture can be made without departing from the scope of this invention. In general it may be said that very small amounts of boric acid or salts thereof have been found to have a stimulating effect upon the organisms to be grown and growth is not entirely inhibited up to concentrations of 0.015%, calculated as boric acid. The amount most effective for growth stimulation will vary with different organisms and the optimum amount within the limits stated may easily be determined by one skilled in the art. The basic medium can be prepared without boric acid or its salts, such as sodium tetraborate, for example, and the boric acid or borate added later, if convenient.

The term digestate as used in the appended claims defines the product obtained by digesting the proteinaceous materials given with the enzymes as described.

Having now described my invention what I wish to claim is:

1. A culture medium for bacteria which comprises a solution obtained by the combined peptic and tryptic digestion of egg albumen, casein and blood fibrin, and a substance chosen from the group consisting of boric acid and salts thereof in an amount sufficient to advance the growth of bacteria.

2. A culture medium for bacteria comprising a mixture obtained by the combined peptic and tryptic digestion of egg albumen, casein and blood fibrin, and from 0.00001 percent to 0.015 percent of boric acid.

3. A culture medium for bacteria comprising a nutrient material for bacteria and from 0.00001 percent to 0.15 percent of boron calculated as boric acid.

4. A culture medium for bacteria comprising a nutrient material for bacteria and not more than about 0.0002 percent of boron calculated as boric acid.

JOHN H. GLYNN.